United States Patent
White, Jr. et al.

(10) Patent No.: US 9,692,678 B2
(45) Date of Patent: Jun. 27, 2017

(54) METHOD AND SYSTEM FOR DELEGATING ADMINISTRATIVE CONTROL ACROSS DOMAINS

(71) Applicant: Cisco Technology, Inc., San Jose, CA (US)

(72) Inventors: David C. White, Jr., Durham, NC (US); Jay Kemper Johnston, Raleigh, NC (US); Christopher Blayne Dreier, Austin, TX (US)

(73) Assignee: Cisco Technology, Inc., San Jose, CA (US)

( * ) Notice: Subject to any disclaimer, the term of this patent is extended or adjusted under 35 U.S.C. 154(b) by 225 days.

(21) Appl. No.: 14/069,993

(22) Filed: Nov. 1, 2013

(65) Prior Publication Data
US 2015/0128264 A1 May 7, 2015

(51) Int. Cl.
H04L 12/26 (2006.01)
H04L 29/06 (2006.01)
H04L 29/08 (2006.01)

(52) U.S. Cl.
CPC .......... *H04L 43/10* (2013.01); *H04L 63/1441* (2013.01); *H04L 63/1458* (2013.01); *H04L 63/20* (2013.01); *H04L 67/30* (2013.01); *H04L 63/14* (2013.01); *H04L 63/1408* (2013.01); *H04L 63/1416* (2013.01); *H04L 67/303* (2013.01)

(58) Field of Classification Search
CPC . H04L 63/14; H04L 63/1408; H04L 63/1416; H04L 63/1441; H04L 63/1458; H04L 63/10; H04L 63/12; H04L 43/10; H04L 67/303; H04L 63/20; H04L 67/30
See application file for complete search history.

(56) References Cited

U.S. PATENT DOCUMENTS

| | | | |
|---|---|---|---|
| 2006/0282525 A1* | 12/2006 | Giles | H04L 63/1441 709/224 |
| 2009/0171474 A1* | 7/2009 | Birze | G05B 19/042 700/3 |
| 2011/0196971 A1* | 8/2011 | Reguraman | H04L 45/00 709/228 |
| 2015/0143470 A1* | 5/2015 | Stiekes | G06F 9/468 726/4 |

* cited by examiner

*Primary Examiner* — Morshed Mehedi
*Assistant Examiner* — Ayoub Alata
(74) *Attorney, Agent, or Firm* — Meunier Carlin & Curfman LLC

(57) ABSTRACT

In one embodiment, a method for delegating partial administrative controls across one or more administrative domains is provided. An upstream network device may advertise capabilities for controlling certain administrative functions to a downstream network device. The downstream network device may choose to act on one or more capabilities, allowing for partial administrative control across the administrative domain.

20 Claims, 3 Drawing Sheets

METHOD AND SYSTEM FOR DELEGATING ADMINISTRATIVE CONTROL ACROSS DOMAINS

TECHNICAL FIELD

The present disclosure relates generally to communicating across network administrative domains.

BACKGROUND

Network devices like routers, servers, switches, and firewalls are designed to process transient traffic that they receive by following rules defined in their configuration. When these devices are within the same Administrative Domain (AD) (i.e., a collection networks, computers, and databases under a common administration), the administrator can apply similar policies throughout the network. However, when one of these devices sits outside of the AD, the network device has little, if any, control on what traffic it receives. Accordingly, downstream network devices that receive traffic from a device outside the AD are without the ability to dictate traffic parameters regarding the traffic they receive. This is disadvantageous. For instance, during a denial of service (DoS) attack, an upstream network device that is outside of the AD will continue to send data even though the downstream network device has become overwhelmed by the attack, potentially resulting in loss of service or capacity for customer/client devices connected to the downstream network device.

DESCRIPTION OF EXAMPLE EMBODIMENTS

Overview

Figure 1:
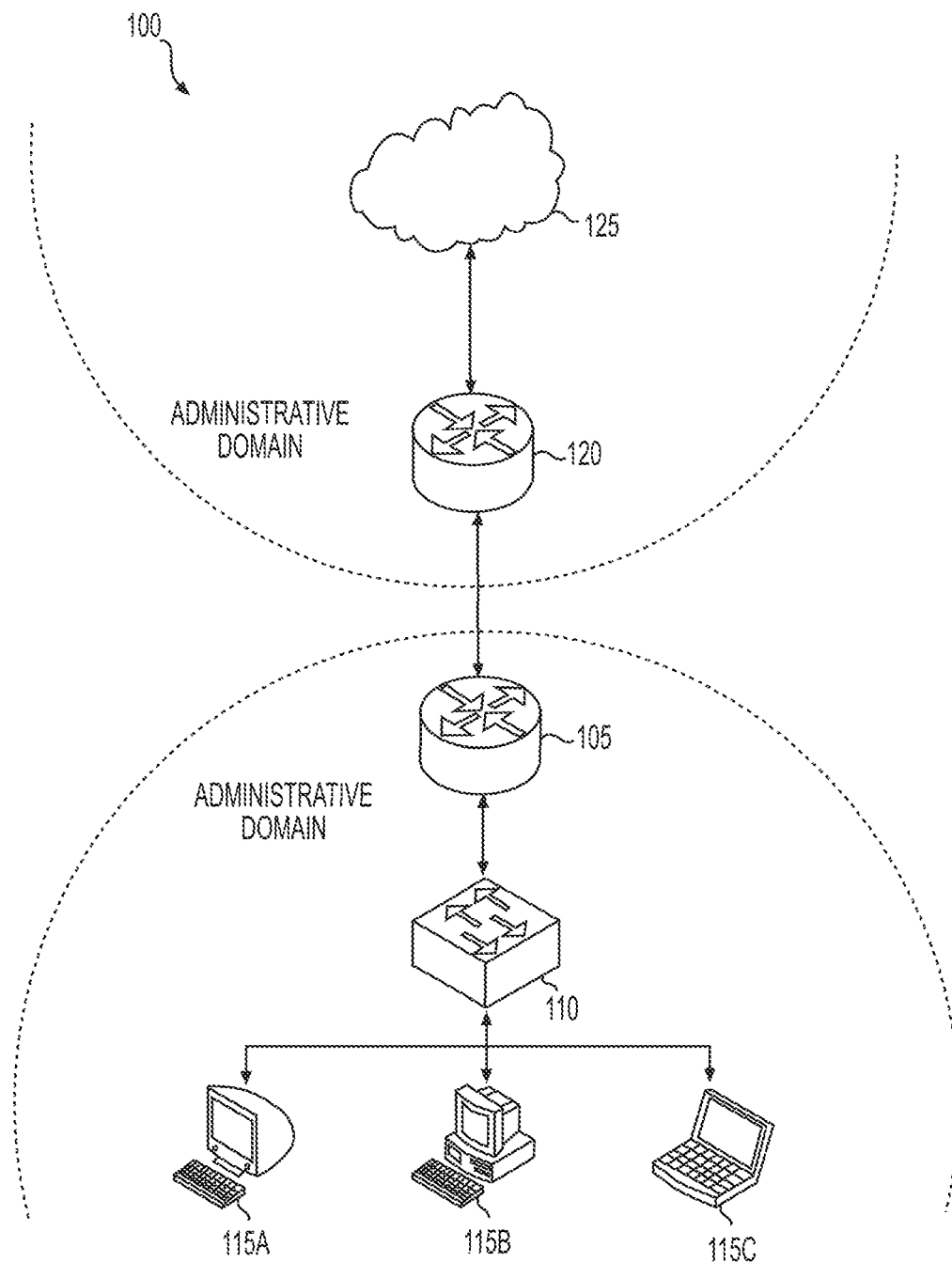
FIG. 1 illustrates a representative network operating environment according to one exemplary implementation of the invention.

The administrative delegation system disclosed herein provides a system and method whereby the receiver of network traffic can have more control over parameters relating to the traffic/data it receives across administrative domains. According to the disclosures presented herein, one method of delegating administrative access to a downstream network device may comprise advertising capabilities for delegation of partial administrative control by an upstream network device to a downstream network device, receiving at the upstream network device a request from the downstream network device a selection of the one or more capabilities for partial administrative control, and delegating by the upstream network device partial administrative control to the downstream network device in response to selection of one or more capabilities for partial administrative control.

Description

In exemplary implementations disclosed herein, the administrative delegation system can control upstream traffic at a device outside of the administrative domain (AD). This may be performed by querying the upstream network device (i.e., the device outside of the AD) for one or more possible administrative domain controls and, in response, receiving an advertisement of such controls from the upstream network device. In an exemplary implementation, the upstream network device may advertise the administrative control capabilities to network devices across administrative domains with or without prompting from a downstream network device. The administrative controls that the downstream devices may control and/or modify can relate to the traffic that the downstream device receives. For example, the upstream network device may allow the downstream device to rate-limit the data being passed to it, perform traffic inspection services, reject traffic matching a specific profile, perform statistical analysis for report generation, prioritize traffic to be sent, or provide load-balancing instructions/next-hop information for specific traffic flows.

In an exemplary implementation, ISPs may deploy the administrative delegation system on their routers. Doing so would allow ISP customers (e.g., businesses operating commercial websites through an ISP) to have more control of the traffic that they receive from their ISP devices. One exemplary implementation would allow the customer to rate-limit traffic received from the ISP, providing a beneficial solution should the customer of the ISP be under a DoS attack. Indeed, instead of contacting the ISP, the customer could select and apply specific traffic filters on the ISP device thorough the administrative delegation system. The upstream network device would then, for example, reject or limit traffic to the downstream network device across the AD as directed by the downstream network device. Additionally, in addition to rate-limiting (e.g., throttling traffic), the ISP may provide other partial administrative control capabilities to its customers in line with the various exemplary implementations disclosed herein.

To perform the selection of capabilities, the delegation of control by the upstream network may create a "shared trust" model or other security protocol with the downstream network device. In this way, only administrators of downstream systems may be given some control of devices outside their administrative domain (i.e., via shared trust). The upstream administrators thus determine what control they want to delegate downward. Such delegation of control provides flexibility to the downstream administrator while simultaneously offloading some of the workload from the administrator of the upstream device.

The administrative delegation system may exist in both the ISP device (e.g., upstream network device) as well as the customer device (e.g., downstream network device), similar to how routing protocols interact today between such devices. As there can be a trust relationship between a customer and the ISP, a shared secret key may exist between the two devices to allow for authentication and encryption. Customers would then send messages from their network device to instruct the ISP device as to what traffic to filter or rate-limit. Additionally, in one implementation, the system can be implemented using TCP for reliable delivery and acknowledgment of the commands. Accordingly, the communication would be authenticated and encrypted (via pre-shared keys) to ensure rouge hosts could not send commands on behalf of a customer.

In accordance with the above, one example of delegating partial administrative control across administrative domains may occur in an edge router for a small or medium sized business (SMB) customer. It may have a single link to its ISP router, and one of the devices behind it may be getting attacked with a DoS attack. The administrator of the network can configure rate-limiting/TCP intercept on the edge router to protect the internal network and end server, but what are left unprotected are the edge router and the customer-to-ISP link. Often in these types of attacks, either the link is saturated between the ISP router and the edge router, or the edge router itself is overwhelmed. In both cases the entire network becomes affected. It is a big challenge for the customer to work with the ISP to block/rate limit this traffic further upstream.

The administrative delegation system disclosed herein may be used to solve this problem by allowing the local network administrator to request that the upstream router block or rate-limit specific traffic it is sending downstream to it. As noted, this may occur over a secure connection between the two devices. Thus, the local network administrator now has the capability to decide what traffic it receives from an upstream administrative domain. Alternatively, the system may automatically invoke the partial delegation system as necessary. For example, in a software-defined network, a processor in the downstream network device may automatically request certain administrative delegations from the upstream network device based on dynamic traffic conditions at the downstream network device. In this way the selection of counter-measures to adverse conditions such as DoS attacks may be automatically taken by the downstream network device through invoking the administrative delegation system and methods disclosed herein.

As another example of the type of the capabilities that may be provided by the administrative delegation system, an upstream router may advertise that it is capable of providing Intrusion Prevention Services (IPS) or Content Inspection services for the traffic being sent downstream. The local network administrator may choose to enable these services on all (or a sub-set) of the traffic it receives. The ISP could optionally bill the customer for this use of services. In any event, it is the end customer which is both given control and options over the traffic it receives.

Accordingly, the administrative delegation system solves the problems mentioned previously by allowing the customer to decide what traffic parameters should be controlled/delegated and then sends a command to the upstream ISP router which will automatically apply the changes. To use this functionality the customer may enter a command on their router (or network device) which defines a flow, and then specifies an action for that flow. As noted, the action may be in one instance to block or to rate limit the traffic (at a specified rate). Additionally, the customer could specify an optional time duration. If no time duration is specified, however, a time limit of "forever" may be assumed.

As shown in the examples found herein, there may also be commands to show all current rules applied to the upstream device and to view statistics for packet counters for each rule. Below are exemplary command sequences for utilizing the administrative delegation system according to one implementation (note that the receiving device (the ISP router in this case) would apply the rules received as egress rules on the outbound interface from which the request was received):

Examples

Config

```
!
peer-action ATT
    Interface FastEthernet 0/1
    shared-secret C1$c0
    peer address 2.2.2.2
!
```

Command to See What Capabilities are being Advertised from Peer:

| router# show peer-action capabilities ATT | |
|---|---|
| Actions | Description |
| block | Drop all traffic matching specified parameters |
| rate-limit | Apply rate-limiting to traffic matching specified parameters |
| IPS | Apply Intrusion Prevention Services to matching traffic |

Command to Invoke the Filtering Action:

```
peer-action [name] [num] [action] [forever|minutes] match [proto]
    [srcIP] [eq|lt|gt]
[port] [destIP] [eq|lt|gt]
```

To Remove the Action:

no peer-action [name] [num]

Assume a customer is getting hit with a 1 Gbps DoS attack destined to 10.1.1.1 on TCP/80, and sourced from various hosts on port 444. The customer could issue the following command on their router to block this traffic from being sent from their ISP device:

router# peer-action ATT 1 block forever match tcp any eq 444 host 10.1.1.1 80

If it is desired to apply the command for 1 hour, then it would be:

router# peer-action ATT 1 block 01:00:00 match tcp any eq 444 host 10.1.1.1 80

Similarly, if it is desired to rate-limit all web traffic destined to 10.1.1.1 to 2 Mbps router# peer-action ATT 1 rate-limit 2000000 forever match tcp any host 10.1.1.1 80

To see statistics of the feature:

| router# show peer-action statistics | | | | | | | | | |
|---|---|---|---|---|---|---|---|---|---|
| Num | Action | Prot | SRC IP | Port | Dest IP | Port | TimeLeft | Pkts | Bytes | Rate |
| 1 | block | tcp | any | 444 | 10.1.1.1 | 80 | 00:01:32 | 54445 | 4654546 | 20 Mb |
| 2 | rate-limit 20000 | tcp | any | any | 10.1.1.1 | 80 | —:—:— | 153543 | 515343873 | 15 Mb |

Now referring to FIG. 1, an exemplary operating environment 100 for the administrative delegation system is illustrated. The environment 100 includes customer/client devices 115A-C, which may comprise any number and types of devices, including but not limited to, desktops, laptop computers, handheld mobile devices, or tablets connected to a network switch 110. The customer devices 115A-C may be connected to the switch 110 through, for example, a local area network (LAN), which may be an internal network of a public or private institution such as a business, a university or government office. Further, the connections shown in FIG. 1 to the network 110 may be any type of wire, optical fiber or wireless connection, for example, Wi-Fi (IEEE 802.11x), WiMax (IEEE 802.16), Ethernet, 3G, or 4G. Regardless of the connection types, the customer network switch 110 may in turn be in communication with a router 105. All of these devices may exist in a first administrative domain as shown.

Additionally, as shown, a second administrative domain may exist that includes router 120. This router, which may in one example implementation be an ISP providing Internet connectivity to the first administrative domain, is in turn shown as being routed to the Internet 125. Without use of the partial delegation system and method disclosed herein, the router 105 in the first administrative domain would have no ability to control any administrative functions handled by the router 120 in the second administrative domain. As provided herein, however, the method and systems provided allow the first administrative domain to control certain capabilities at the router 120.

Figure 2:
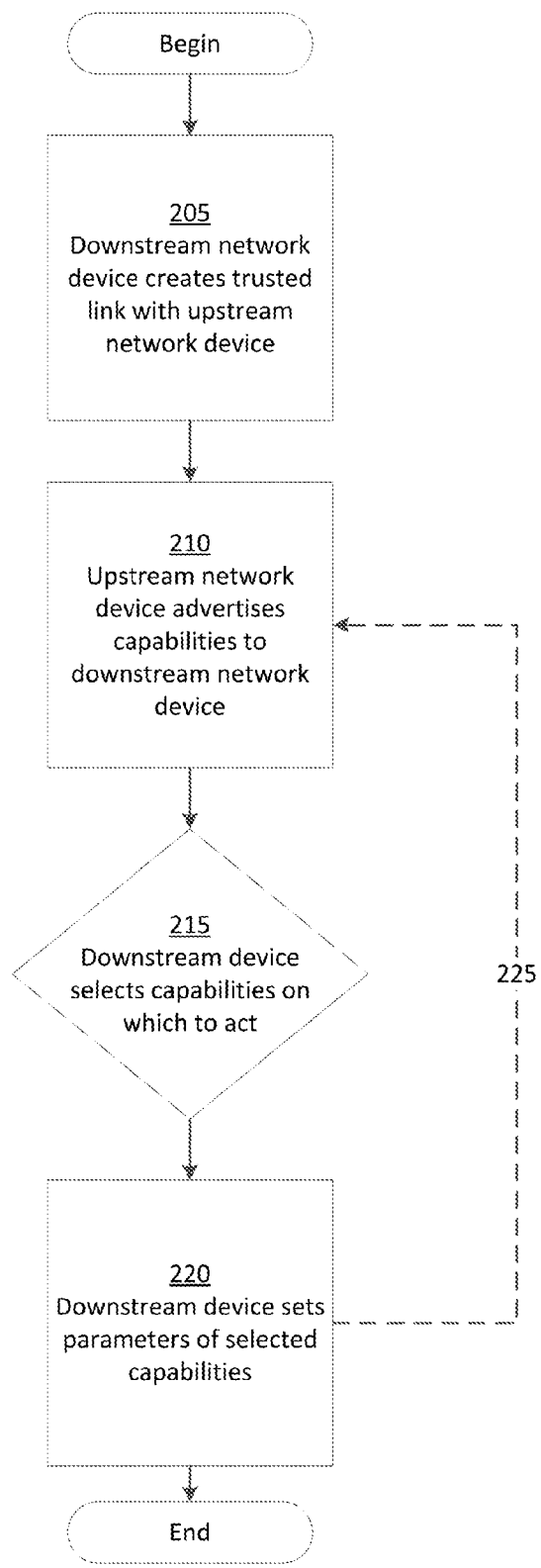
FIG. 2 illustrates a method of delegating partial administrative control across an administrative domain according to an implementation of the invention.

Now with reference to FIG. 2, a method of delegating partial administrative control across an administrative domain according to an exemplary implementation of the invention is shown. Specifically, at step 205, the downstream network device optionally can create a trusted link with the upstream network device. This trusted channel may be created by any variety of security mechanisms, and as noted, may be performed so that administrative controls cannot be inadvertently compromised for the upstream network device. Continuing to step 210, the upstream network device may advertise the capabilities for which it will delegate partial administrative control to the downstream device. This may be done with or without prompting by the downstream network device. As previously discussed, the types of capabilities that may be offered by the upstream device include traffic parameters such as rate-limiting, blocking, and traffic inspection, among others.

At step 215, the downstream device receives the advertisement of capabilities and decides which capabilities to act on. Once selected, the downstream device communicates this decision to the upstream network device along with any necessary parameters for the specified capability at step 220 in order to affect at least some control over the selected capabilities. The process may then be repeated as shown at step 225, whereby additional parameters may be selected for control (and for how long).

Figure 3:
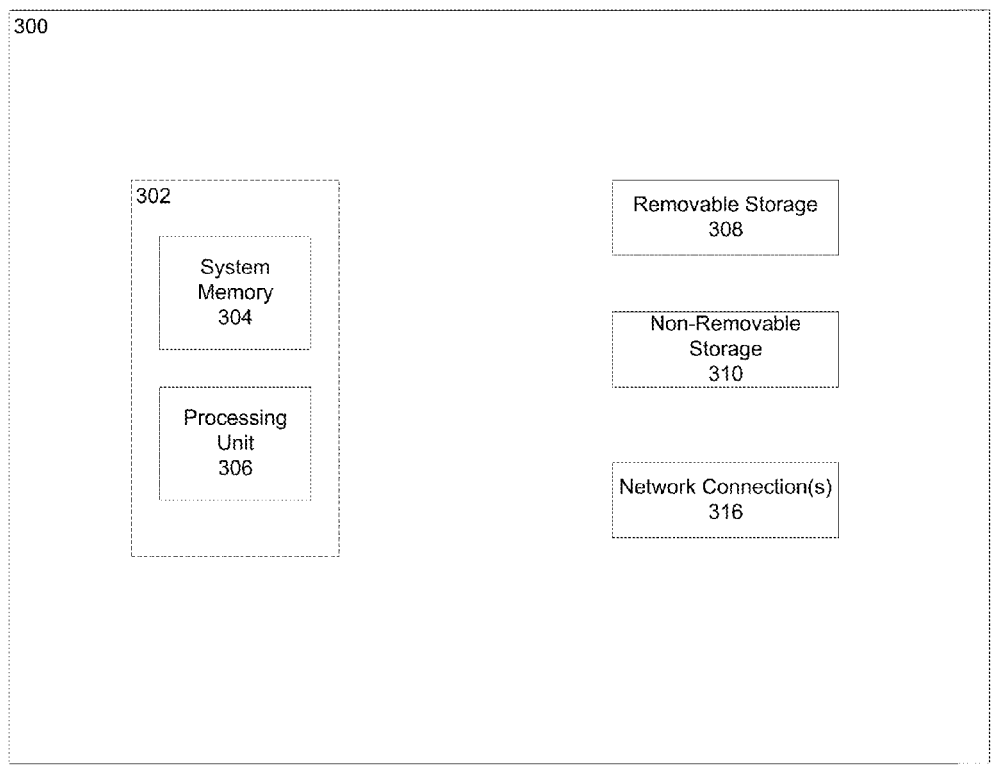
FIG. 3 illustrates an exemplary network device according to an implementation of the invention.

Referring now to FIG. 3, an exemplary network device upon which implementations of the administrative delegations system may be utilized is illustrated. The network device 300, which may be a network router or server, may include a bus or other communication mechanism for communicating information. In its most basic configuration, the network device 300 typically includes at least one processing unit 306 and a system memory 304. Depending on the exact configuration and type of network device, the system memory 304 may be volatile (such as random access memory (RAM)), non-volatile (such as read-only memory (ROM), flash memory, etc.), or some combination of the two. This most basic configuration is illustrated in FIG. 3 by dashed line 302. The processing unit 306 may be a standard programmable processor that performs arithmetic and logic operations necessary for operation of the network device 300.

The network device 300 may also have additional features/functionality, depending on its use. For example, the network device 300 may include additional storage such as removable storage 308 and non-removable storage 310 including, but not limited to, magnetic or optical disks or tapes. The network device 300 may also contain network connection(s) 316 that allow the device to communicate with other devices, such the devices disclosed herein.

The processing unit 306 may be configured to execute program code encoded in tangible, computer-readable media. Computer-readable media refers to any media that is capable of providing data that causes the computing device 300 (i.e., a machine) to operate in a particular fashion. Various computer-readable media may be utilized to provide instructions to the processing unit 306 for execution. Common forms of computer-readable media include, for example, magnetic media, optical media, physical media, memory chips or cartridges, a carrier wave, or any other medium from which a computer can read. Example computer-readable media may include, but is not limited to, volatile media, non-volatile media and transmission media. Volatile and non-volatile media may be implemented in any method or technology for storage of information such as computer readable instructions, data structures, program modules or other data and common forms are discussed in detail below. Transmission media may include coaxial cables, copper wires and/or fiber optic cables, as well as acoustic or light waves, such as those generated during radio-wave and infra-red data communication. Example tangible, computer-readable recording media include, but are not limited to, an integrated circuit (e.g., field-programmable gate array or application-specific IC), a hard disk, an optical disk, a magneto-optical disk, a floppy disk, a magnetic tape, a holographic storage medium, a solid-state device, RAM, ROM, electrically erasable program read-only memory (EEPROM), flash memory or other memory technology, CD-ROM, digital versatile disks (DVD) or other optical storage, magnetic cassettes, magnetic tape, magnetic disk storage or other magnetic storage devices.

In an example implementation, the processing unit 306 may execute program code stored in the system memory 304. For example, the bus may carry data to the system memory 304, from which the processing unit 306 receives and executes instructions. The data received by the system memory 304 may optionally be stored on the removable storage 308 or the non-removable storage 310 before or after execution by the processing unit 306.

The various techniques described herein may be implemented in connection with hardware or software or, where appropriate, with a combination thereof. Thus, the methods and apparatuses of the presently disclosed subject matter, or certain aspects or portions thereof, may take the form of program code (i.e., instructions) embodied in tangible media, such as floppy diskettes, CD-ROMs, hard drives, or any other machine-readable storage medium wherein, when the program code is loaded into and executed by a machine, such as a computing device, the machine becomes an apparatus for practicing the presently disclosed subject matter. In the case of program code execution on programmable computers, the computing device generally includes a processor, a storage medium readable by the processor (including volatile and non-volatile memory and/or storage elements), at least one input device, and at least one output device. One or more programs may implement or utilize the processes described in connection with the presently disclosed subject matter, e.g., through the use of an application programming interface (API), reusable controls, or the like. Such programs may be implemented in a high level procedural or object-oriented programming language to communicate with a computer system. However, the program(s) can be implemented in assembly or machine language, if desired. In any case, the language may be a compiled or interpreted language and it may be combined with hardware implementations.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed:

1. A method comprising:
    connecting across a trusted communications channel a customer/client device in a first administrative domain to an upstream network device in a second administrative domain, wherein the customer/client device and the upstream network device share a secret key for authentication;
    advertising capabilities of said upstream network device across the trusted communications channel for delegation of partial administrative control by the upstream network device to the customer/client device, wherein said advertising occurs without prompting by the customer/client device;
    receiving at the upstream network device a request from the customer/client device comprising a selection of one or more capabilities for partial administrative control; and
    delegating by the upstream network device partial administrative control to the customer/client device in response to the selection of the one or more capabilities for partial administrative control, wherein types of said capabilities that offered by the upstream device in the advertised capabilities include traffic parameters of rate-limiting for a specific traffic, blocking a specific traffic, and traffic inspection for a specific traffic.

2. The method of claim 1, further comprising receiving an initial request from the customer/client device prior to broadcasting the capabilities for partial administrative control.

3. The method of claim 2, wherein the customer/client device sends the initial request upon recognition of an adverse traffic event at the downstream network device.

4. The method of claim 3, wherein the adverse traffic event comprises a denial of service attack.

5. The method of claim 1, wherein the delegation of partial administrative control comprises the ability to adjust an amount of traffic sent from the upstream network device to the customer/client device in response to a denial of service attack.

6. The method of claim 1, wherein the upstream network device advertises the capabilities for partial administrative control using a protocol established between the upstream network device and the customer/client device.

7. The method of claim 1, further comprising receiving at the upstream network device a time limit for the delegation of the one or more capabilities for partial administrative control.

8. A method comprising:
    connecting across a trusted communications channel a customer/client device in a first administrative domain to an upstream network device router in a second administrative domain, wherein the customer/client device and the upstream network device router share a secret key for authentication;
    using the customer/client device to automatically request administrative delegations from the upstream network device router, based upon dynamic traffic conditions at the customer/client device;
    receiving, via a switch in the first administrative domain and at the customer/client device, an advertisement from the upstream network device router advertising across the trusted communications channel administrative capabilities of the upstream network device router that can be delegated to the customer/client device, wherein said advertising occurs without prompting by the customer/client device and wherein types of said capabilities that offered by the upstream network device router in the advertised capabilities include traffic parameters of rate-limiting for a specific traffic, blocking a specific traffic, and traffic inspection for a specific traffic;
    replying by the customer/client device to the advertisement with a request to the upstream network device router for control of one or more of the advertised administrative capabilities; and
    administering the one or more advertised administrative capabilities by the customer/client device.

9. The method of claim 8, wherein one of the advertised administrative capabilities comprises the ability to limit traffic received from the upstream network device router.

10. The method of claim 8, further comprising setting by the downstream network device a length of time for controlling the one or more advertised administrative capabilities.

11. The method of claim 8, further comprising, prior to receiving an advertisement of administrative capabilities, querying the upstream network device router by the downstream network device to send the advertisement of administrative capabilities.

12. The method of claim 11, wherein the downstream network device queries the upstream network device router to send the advertisement of administrative capabilities based upon recognition of an adverse traffic event at the downstream network device.

13. A system comprising:
    an upstream network device providing access to an ISP and connecting across a trusted communications channel to a customer/client device in a first administrative domain when the upstream network device is in a second administrative domain, wherein the customer/client device and the upstream network device share a secret key for authentication, and wherein said upstream network device is configured to advertise without prompting by the downstream network device capabilities relating to traffic parameters of rate-limiting for a specific traffic, blocking a specific traffic, and traffic inspection for a specific traffic sent from the upstream network device to the downstream network device, wherein the downstream network device is a customer/client device connected to the ISP and the upstream network device via a router in the same administrative domain as the customer/client device;
    the router configured to define a traffic flow to the downstream network device and traffic parameters that should be delegated as controlled by the downstream network device to maintain the traffic flow;
    the downstream network device configured to select one or more capabilities advertised by the upstream network device and further configured to define a corresponding action to be implemented by the upstream network device in regard to the one or more capabilities;

wherein the upstream network device is outside of the administrative domain of the downstream network device.

14. The system of claim 13, wherein the downstream network device is configured to query the upstream network device to send the advertisement of the capabilities.

15. The system of claim 13, wherein the downstream network device is configured to select the one or more capabilities for a finite period of time.

16. The system of claim 13, wherein the downstream network device and upstream network device communicate using a network communication protocol.

17. The system of claim 13, wherein the one or more capabilities comprises the ability by the downstream network device to control an amount or type of traffic sent to the downstream network by the upstream network device.

18. The system of claim 13, wherein the one or more capabilities comprises the ability by the downstream network device to utilize deep packet inspection services at the upstream network device.

19. The system of claim 14, wherein the downstream network device is configured to send the query upon automatic recognition of an adverse traffic event at the downstream network device.

20. The system of claim 19, wherein the adverse traffic event is a denial of service attack within the administrative domain of the downstream network device.

* * * * *